US008712075B2

(12) United States Patent
Hu et al.

(10) Patent No.: US 8,712,075 B2

(45) Date of Patent: Apr. 29, 2014

(54) SPATIALLY PRE-PROCESSED TARGET-TO-JAMMER RATIO WEIGHTED FILTER AND METHOD THEREOF

(75) Inventors: Jwu-Sheng Hu, Hsinchu (TW); Ming-Tang Lee, Taoyuan County (TW)

(73) Assignee: National Chiao Tung University, Hsinchu (TW)

( * ) Notice: Subject to any disclaimer, the term of this patent is extended or adjusted under 35 U.S.C. 154(b) by 346 days.

(21) Appl. No.: 13/052,395

(22) Filed: Mar. 21, 2011

(65) Prior Publication Data

US 2012/0093333 A1 Apr. 19, 2012

(30) Foreign Application Priority Data

Oct. 19, 2010 (TW) ............................ 99135582 A

(51) Int. Cl.
*H04B 15/00* (2006.01)

(52) U.S. Cl.
USPC ........ 381/94.3; 381/94.1; 381/94.2; 381/94.7

(58) Field of Classification Search
USPC ........................................................ 381/94.2
See application file for complete search history.

(56) References Cited

U.S. PATENT DOCUMENTS

| | | | |
|---|---|---|---|
| 6,108,610 A * | 8/2000 | Winn | 702/77 |
| 7,174,022 B1 | 2/2007 | Zhang et al. | |
| 7,706,549 B2 | 4/2010 | Zhang et al. | |
| 7,881,480 B2 * | 2/2011 | Buck et al. | 381/94.1 |
| 2008/0232607 A1 * | 9/2008 | Tashev et al. | 381/71.11 |

OTHER PUBLICATIONS

Joerg Bitzer, Klaus Uwe Simmer, and Karl-Dirk Kammeyer. "Theoretical Noise Reduction Limits of the Generalized Sidelobe Canceller (GSC) for Speech Enhancement." IEEE (1999): 2965-68. Web.*

Xuefeng Zhang and Ying Jia. "A Soft Decision Based Noise Cross Power Spectral Density Estimation for Two-Microphone Speech Enhancement Systems." IEEE (2005): 813-16. Web.*

Israel Cohen, "Analysis of Two-Channel Generalized Sidelobe Canceller (GSC) with Post-Filtering"; IEEE Transactions on Speech and Audio Processing, vol. II, No. 6, Nov. 2003, pp. 684-699.

Michael W. Hoffman, Zhao Li, and Devajani Khataniar, "GSC-Based Spatial Voice Activity Detection for Enhanced Speech Coding in the Presence of Competing Speech"; IEEE Transactions on Speech and Audio Processing, vol. 9, No. 2, Mar. 2001, pp. 175-179.

Jwu-Sheng Hu and Ming-Tang Lee, "Spatially Pre-Processed Target-to-Jammer Ratio Weighted Wiener Filter Using Two Microphones"; IEEE, 2010, pp. 180-185.

* cited by examiner

*Primary Examiner* — Davetta W Goins
*Assistant Examiner* — James Mooney
(74) *Attorney, Agent, or Firm* — Rosenberg, Klein & Lee

(57) ABSTRACT

The present invention provides a spatially pre-processed target-to-jammer ratio weighted filter and a method thereof, which uses two microphones to receive audio signals. The audio signals are divided into a plurality of sinusoidal waves by a fast Fourier transform (FFT) module, and a beamformer uses the sinusoidal waves to generate beamformed signals. A reference generator generates at least one reference signal. The beamformed signals and reference signals are used to work out power spectral densities (PSD), and a target-to-jammer ratio (TJR) is worked out with the power spectral densities. TJR is used to determine whether a sound source exists. According to the determination result, a noise estimator is switched to eliminate noise from the beamformed signals and generate output signals. An inverse fast Fourier transform (IFFT) module recombines the output signals and then outputs the recombined signals.

17 Claims, 5 Drawing Sheets

SPATIALLY PRE-PROCESSED TARGET-TO-JAMMER RATIO WEIGHTED FILTER AND METHOD THEREOF

BACKGROUND OF THE INVENTION

1. Field of the Invention

The present invention relates to a speech enhancement technology, particularly to a GSC-based spatially pre-processed TJR weighted filter and a method thereof.

2. Description of the Related Art

Speech interfaces using a two-microphone device has become popular in the consuming electronic products in recent years. There have been many research works involved in the two-channel speech enhancement issue, and one of the widely used schemes is the adaptive filter based on GSC (Generalized Sidelobe Canceller) structure. For two-microphone speech enhancement, the GSC structure allows one to pre-process the input signals by steering a beam and a null into the direction of a target source. It provides an efficient estimate of the characteristics of the target source and noise in a short time interval. The GSC structure is usually divided into three parts: a fixed beamformer, a blocking matrix (or vector), and a (multichannel) noise estimator.

The noise estimator uses the blocked signals and is commonly recommended to perform estimation in the absence of the target signal source lest the desired signal be cancelled. There are two common ways to start/stop estimation: one of them is to use a voice activity detector (VAD); the other one is to evaluate the auto- and cross-spectral densities from the inputs under a specified assumption. The former one relies on the performance of VAD, and the latter one might be impaired by a non-stationary coherent interference.

Accordingly, the present invention proposes a spatially pre-processed target-to-jammer ratio weighted filter and a method thereof to overcome the abovementioned problems. The principles and embodiments of the present invention will be described in detail below.

SUMMARY OF THE INVENTION

The primary objective of the present invention is to provide a spatially pre-processed target-to-jammer ratio (TJR) weighted filter and a method thereof, wherein a TJR weighted Wiener solution is used to estimate the target sound source lest the target sound source be cancelled in estimation.

Another objective of the present invention is to provide a spatially pre-processed target-to-jammer ratio weighted filter and a method thereof, wherein the methods for using the ratios of the power spectral densities (PSDs) of a beamformed signal and a reference signal to switch the noise estimator include the optimized Wiener solution or TJR weighted new Wiener solution.

A further objective of the present invention is to provide a spatially pre-processed target-to-jammer ratio weighted filter and a method thereof, wherein a beamformed signal, a reference signal and a mixture thereof are used to estimate noise.

To achieve the abovementioned objectives, the present invention proposes a spatially pre-processed target-to-jammer ratio weighted filter, which comprises two microphones, an FFT (Fast Fourier Transform) module, a beamformer, a reference generator, a power spectral density (PSD) estimator, a noise estimator, and an inverse-FFT (IFFT) module. The microphones receive audio signals. The FFT module divides the audio signal into a plurality of sinusoidal waves. The beamformer and the reference generator respectively generate beamformed signals and reference signals according to the sinusoidal waves. The PSD estimator works out PSDs according to the beamformed signals and the reference signals and obtains TJR according to PSDs. The noise estimator determines whether a target sound source exists according to TJR and switches according to the determination result to eliminate noise from the beamformed signals and generate output signals. The IFFT module recombines the output signals and sends out the recombined signals.

The present invention also proposes a method for a spatially pre-processed target-to-jammer ratio weighted filter, which comprises steps: using two microphones to receive audio signals; using FFT to divide the audio signal into a plurality of sinusoidal waves and form the frequency spectrum of the audio signal; using a beamformer to convert the sinusoidal waves into beamformed signals, and generating at least one reference signal; working out PSDs according to the beamformed signals and the reference signals, and obtaining TJR according to PSDs; determining whether a target sound source exists according to TJR, and switching a noise estimator according to the determination result to eliminate noise from the beamformed signals, and generating output signals; using IFFT to recombine the output signals and sending out the recombined signals.

Below, the embodiments are described in detail to make easily understood the objectives, technical contents, characteristics, and accomplishments of the present invention.

DETAILED DESCRIPTION OF THE INVENTION

Figure 1:
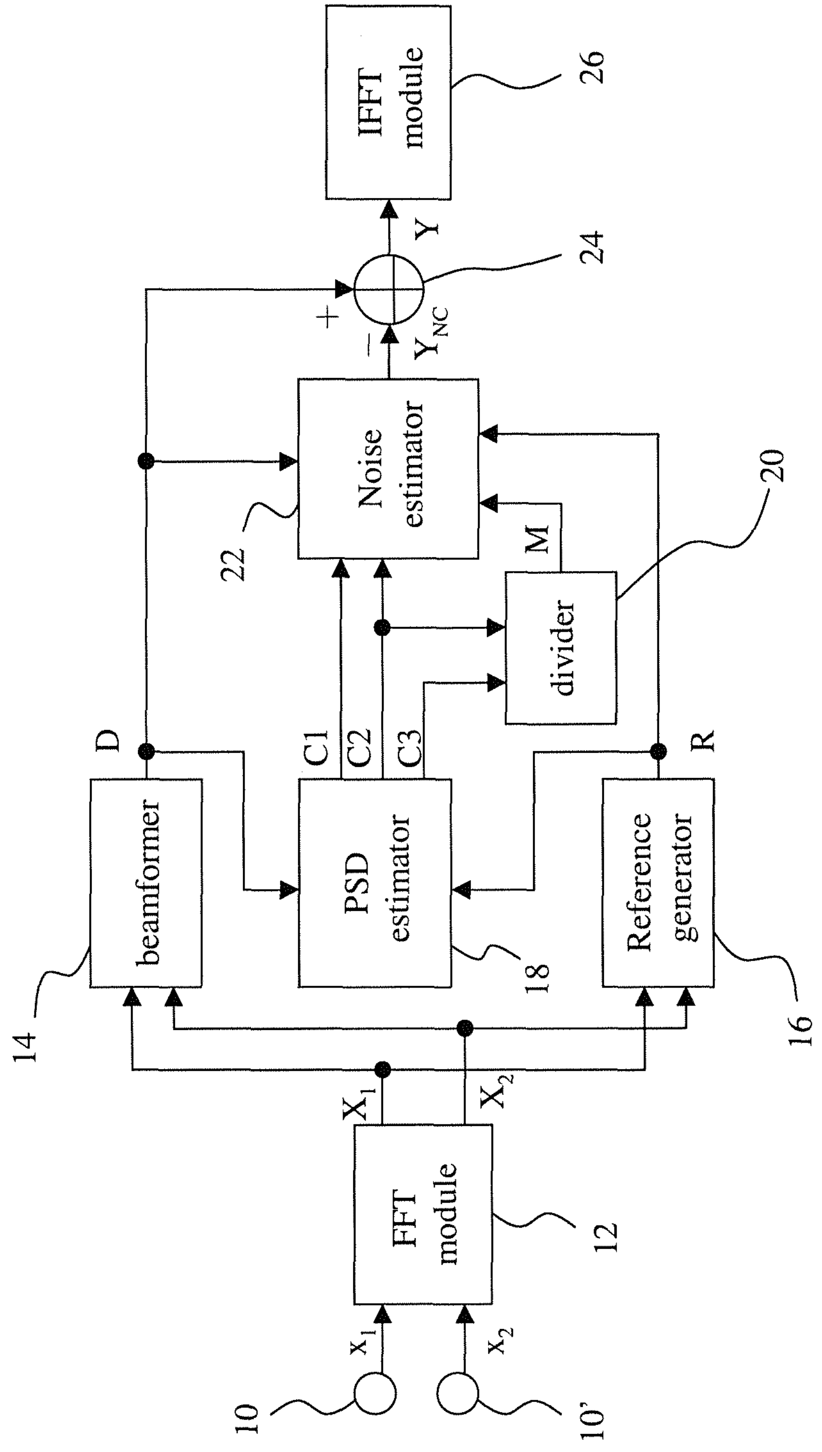
FIG. 1 is a block diagram schematically showing the architecture of a spatially pre-processed TJR weighted filter according to one embodiment of the present invention.

The present invention proposes a spatially pre-processed target-to-jammer ratio (TJR) weighted filter and a method thereof. Refer to FIG. 1 a block diagram schematically showing the architecture of a spatially pre-processed TJR weighted filter according to one embodiment of the present invention. The spatially pre-processed TJR weighted filter of the present invention comprises two microphones 10 and 10', an FFT module 12, a beamformer 14, a reference generator 16, a power spectral density (PSD) estimator 18, a noise estimator 22, and an IFFT module 26.

The microphones 10 and 10' receive sounds to respectively obtain two audio signals x1 and x2. The FFT module 12 respectively divides the audio signals x1 and x2 into a plurality of sinusoidal waves X1 and a plurality of sinusoidal waves X2. The beamformer 14 and the reference generator 16 respectively generate a beamformed signal D and a reference signal R according to the sinusoidal waves X1 and X2. The PSD estimator 18 works out PSDs according to the beamformed signal D and the reference signal R, and then obtains TJR according to PSDs. The noise estimator 22 determines whether a target sound source exists according to TJR, switches according to the determination result to eliminate noise from the beamformed signal D, and generates output signals $Y_{NC}$. The IFFT module 26 recombines the output signals $Y_{NC}$ and sends out the recombined signals. In one embodiment, the FFT module 12 is a dual-channel one.

Figure 2:
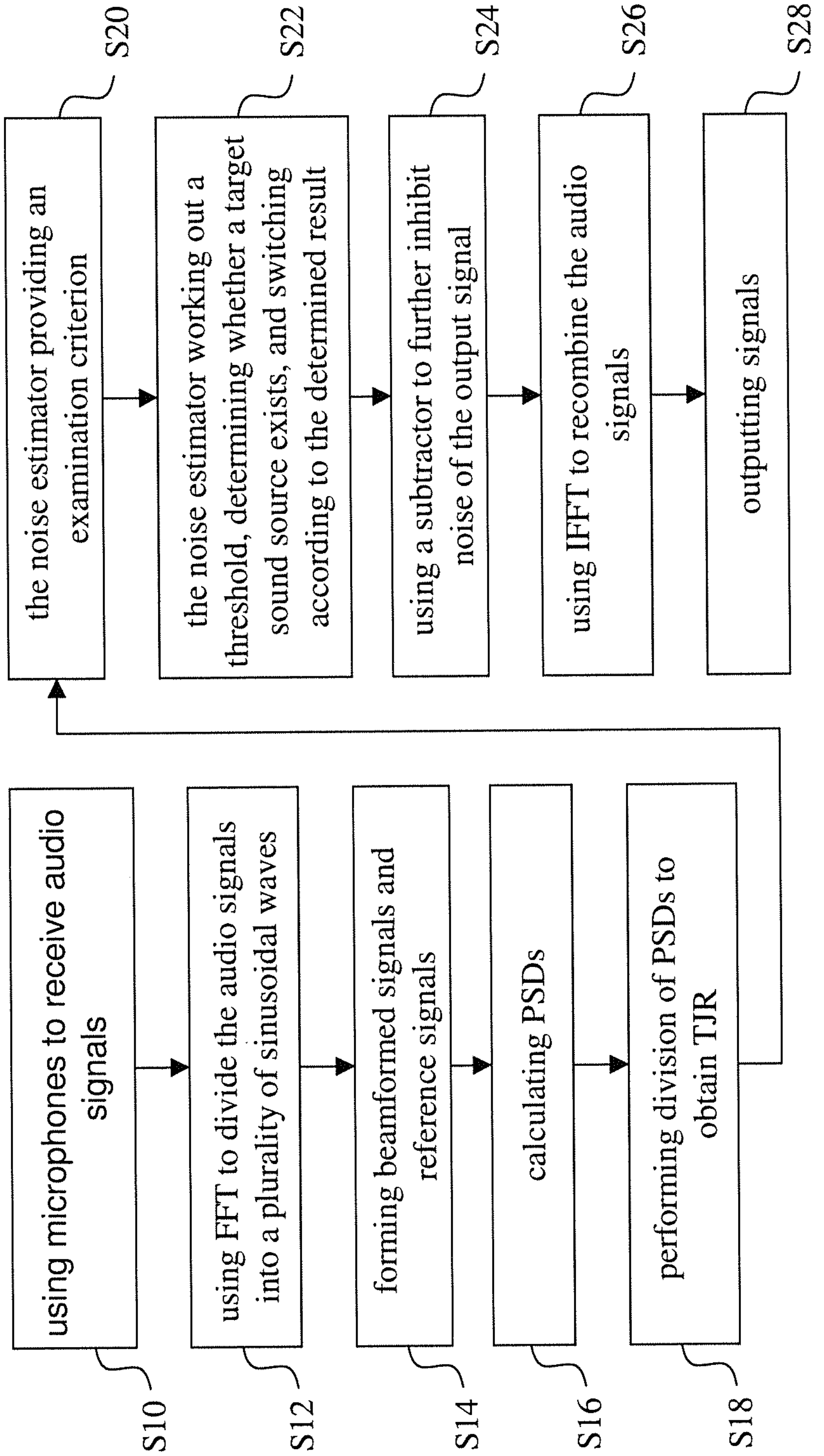
FIG. 2 is a flowchart of a method for a spatially pre-processed TJR weighted filter according to one embodiment of the present invention.

Refer to FIG. 1 again, and refer to FIG. 2 a flowchart of a method for a spatially pre-processed TJR weighted filter according to one embodiment of the present invention. In Step S10, after the microphones receive sounds, start the filter. Thus, all registers, indexes and buffers are initiated to wait interruption. After the data of the microphones is made ready, interruption is done. At this time, the registers have stored a plurality of parameter values to be used later. The data of the microphones is retrieved and divided into a plurality of frames. For example, the audio signals x1 and x2 in FIG. 1 belong to the first frame output by the microphones 10 and 10'.

Next, in Step S12, the FFT module 12 performs fast Fourier transform to divide each of the audio signals xl and x2 into a plurality of sinusoidal waves. Each sinusoidal wave represents a frequency band. The frequency bands are further calculated again one by one. The sinusoidal waves of the first frequency band are calculated firstly. The outputs X1 and X2 are the sinusoidal waves of the audio signals xl and x2 of the first frequency band. The calculation in Step S12 is as follows:

At present, the spatially pre-processed TJR weighted Wiener filter is extensively used. Below are the Wiener approximate solutions under the GSC architecture. GSC has been widely used in speech enhancement issues. For the two-channel case, with the assumption of a simple delay model for the target sound source, the input signals after doing fast Fourier transform can be described as Equation (1):

$$X_1(k,l)=S(k,l)+N_1(k,l)$$

$$X_2(k,l)=e^{-j\omega\tau}S(k,l)+N_2(k,l) \tag{1}$$

wherein k and l are respectively the frequency index and frame index, $X_1(k,l)$ and $X_2(k,l)$ the microphone input signals, S(k,l) the desired signal, $N_1(k,l)$ and $N_2(k,l)$ the noise in the inputs, $\tau=d\sin\theta/c$ the desired signal's time delay between the two microphones, and wherein d is the inter-spacing between the microphones, θ is the arrival direction relative to a front surface.

Figure 4:
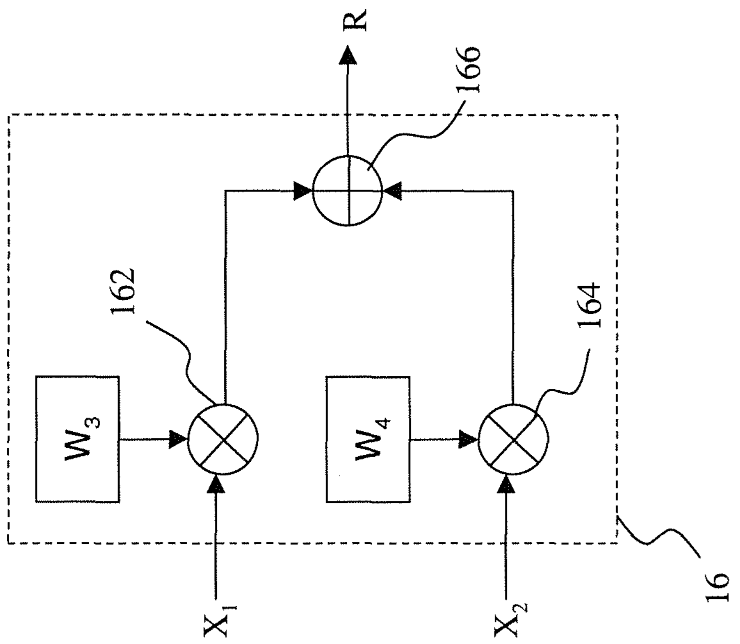
FIG. 4 is a block diagram schematically showing a reference generator according to one embodiment of the present invention.
Figure 3:
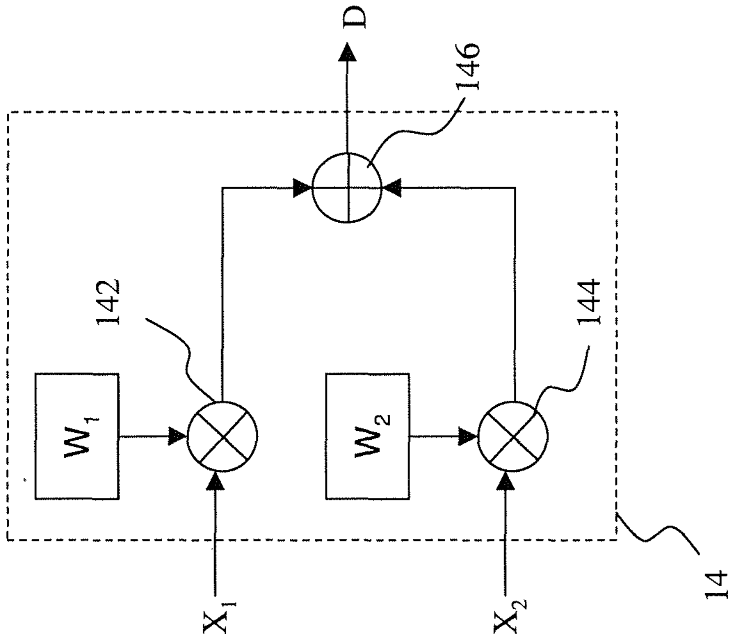
FIG. 3 is a block diagram schematically showing a beamformer according to one embodiment of the present invention.

In Step S14, the beamformer 14 and the reference generator 16 respectively receive X1 and X2 and generate a beamformed signal D and a reference signal R. Refer to FIG. 3 a block diagram schematically showing a beamformer 14. X1 and X2 are respectively input to multipliers 142 and 144. Meanwhile, two register parameters W1 and W2 are also respectively input to the multipliers 142 and 144. The calculation results of the multipliers 142 and 144 are added in an adder 146 to obtain the beamformed signal D. Refer to FIG. 4 a block diagram schematically showing a reference generator 16. X1 and X2 are respectively input to multipliers 162 and 164. Meanwhile, two register parameters W3 and W4 are also respectively input to the multipliers 162 and 164. The calculation results of the multipliers 162 and 164 are added in an adder 166 to obtain the reference signal R.

Suppose that the fixed beamforming vector of the beamformer 14 and the blocking vector of the reference generator 16 at a frequency index k for the GSC-based Wiener filter are respectively $w_0(k)$ and h(k). $w_0(k)$ and h(k) can be expressed by Equation (2):

$$w_0(k)=[1e^{-j\omega\tau}]^T$$

$$h(k)=[1-e^{-j\omega\tau}]^T \tag{2}$$

wherein ω is the angular frequency corresponding to the frequency index k. For example, when $\omega=2\pi kf_s/NFFT$, $f_s$ represents the sampling rate, and NFFT represents the FFT size. The GSC output can be obtained from Equation (3):

$$\begin{aligned} Y(k,l) &= w_0^H(k)X(k,l) - G^*(k,l)\cdot h^H(k)X(k,l) \\ &= D(k,l) - G^*(k,l)U(k,l) \\ &= D(k,l) - Y_{NC}(k,l) \end{aligned} \tag{3}$$

wherein $X(k,l)=[X_1(k,l), X_2(k,l)]^T$ is the input vector, and wherein * denotes conjugation and denotes conjugation transpose, and wherein * G(k,l) is the weighting to be determined. The optimization criterion to minimize the output power can be expressed by Equation (4):

$$\min_G E[|Y(k,l)|^2] = \min_G E[|D(k,l) - G^*(k,l)U(k,l)|^2] \tag{4}$$

The optimized Wiener solution of this minimization problem can be expressed by Equation (5):

$$\begin{aligned} G_{opt}(k,l) &= (E[U(k,l)U^*(k,l)])^{-1}E[U(k,l)D^*(k,l)] \\ &= P_{UU}^{-1}(k,l)P_{UD}(k,l) \end{aligned} \tag{5}$$

The close-form Wiener solution is difficult to implement and unable to track changes in the environment. Hence, adaptive approximate solutions based on the orthogonal principle were proposed in many works. Rather than using the adaptive approach, the present invention adopts the approximation of the auto- and cross-spectral densities of the spatially pre-processed data to obtain the approximate Wiener solution with (5).

In Step S16, the auto- and cross-spectral densities are estimated by recursively averaging past spectral power values of the measurements according to Equation (6):

$$P_{UU}(k,l) = \alpha\cdot P_{UU}(k,l-1) + (1-\alpha)\sum_{i=-w}^{w} b(i)U(k-i,l)U^*(k-i,l) \tag{6}$$

$$P_{DD}(k,l) = \alpha\cdot P_{DD}(k,l-1) + (1-\alpha)\sum_{i=-w}^{w} b(i)D(k-i,l)D^*(k-i,l)$$

$$P_{DU}(k,l) = \alpha\cdot P_{DU}(k,l-1) + (1-\alpha)\sum_{i=-w}^{w} b(i)D(k-i,l)U^*(k-i,l)$$

wherein $P_{UU}(k,l)$ is the PSD of the reference signal, $P_{DD}(k,l)$ is the PSD of the beamformed signal, and $P_{DU}(k,l)$ is the cross-PSD of the beamformed signal and the reference signal, and wherein α ($0<\alpha<1$) is the forgetting factor, and b a normalization window function ($\Sigma_{i=-w}^{w}b(i)=1$). In order to keep the tracking ability and avoid the echo-like effect, the value of the forgetting factor should not be too large.

Figure 5:
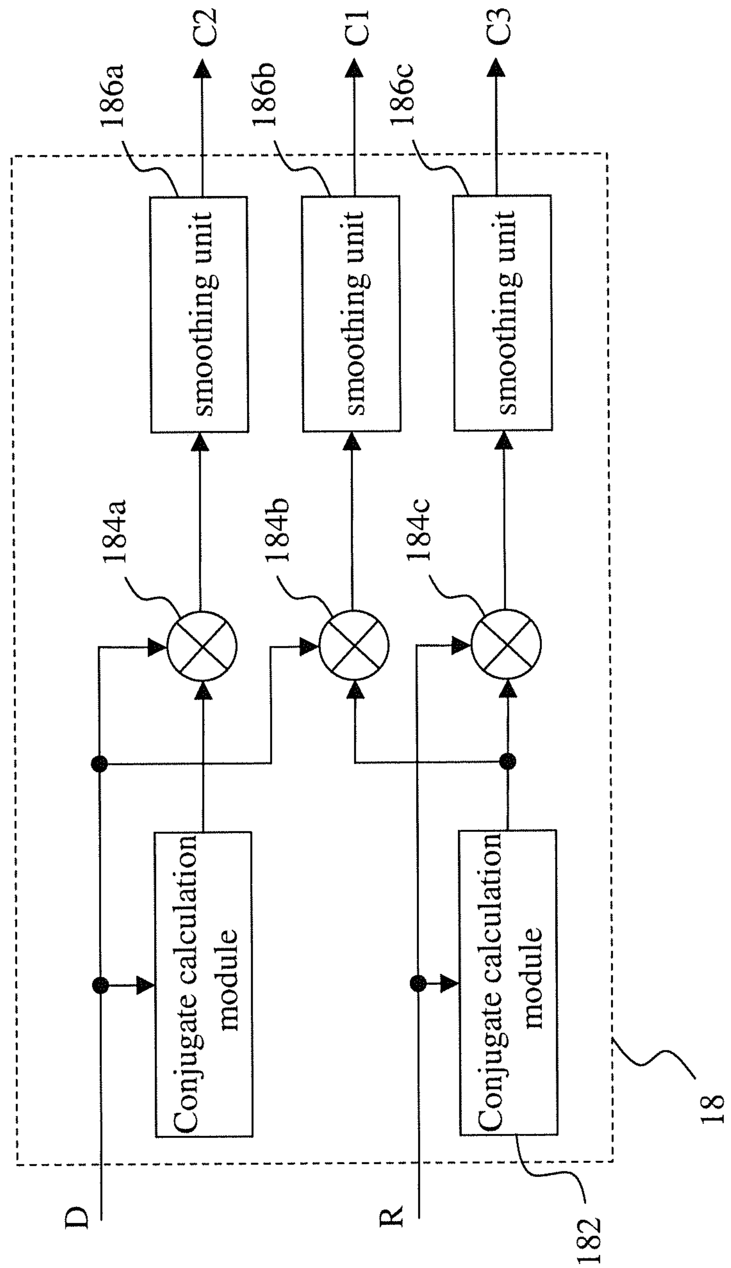
FIG. 5 is a block diagram schematically showing a PSD estimator according to one embodiment of the present invention.

Refer to FIG. 5 a block diagram schematically showing a PSD estimator 18. The PSD estimator 18 includes two conjugate calculation modules 182 converting the complex numbers of the signals into conjugate signals. A multiplier 184*a* will receive a beamformed signal D and a conjugate thereof D*. A multiplier 184*b* will receive the beamformed signal D and the conjugate R* of the reference signal R. A multiplier 184*c* will receive the reference signal R and the conjugate thereof R*. Three smoothing units 186*a*, 186*b* and 186*c* respectively receive the calculation results of the three multipliers 184*a*, 184*b* and 184*c* and output $P_{DD}(k,l)$ PSD of the beamformed signal, $P_{UU}(k,l)$ PSD of the reference signal, and $P_{DU}(k,l)$ cross-PSD of the beamformed signal and the reference signal, which respectively equal to C2, C3 and C1 shown in FIG. 1.

In order to avoid cancellation of the desired signal, it is recommended that the Wiener solution is estimated during absence of the desired signal. Hence, a soft VAD mechanism is needed to decide the weight of the Wiener solution. In the present invention, TJR (Target-to-Jammer Ratio) is introduced to meet the need. As shown in FIG. 1, the divider 20 receives C2 and C3, divides $P_{DD}(k,l)$ PSD of the beamformed signal with $P_{UU}(k,l)$ PSD of the reference signal to obtain TJR and then outputs a signal M. The operation can be expressed by Equation (6):

$$TJR(k,l)=\frac{E[D(k,l)D^*(k,l)]}{E[U(k,l)U^*(k,l)]}=\frac{P_{DD}(k,l)}{P_{UU}(k,l)} \quad (7)$$

Figure 6:
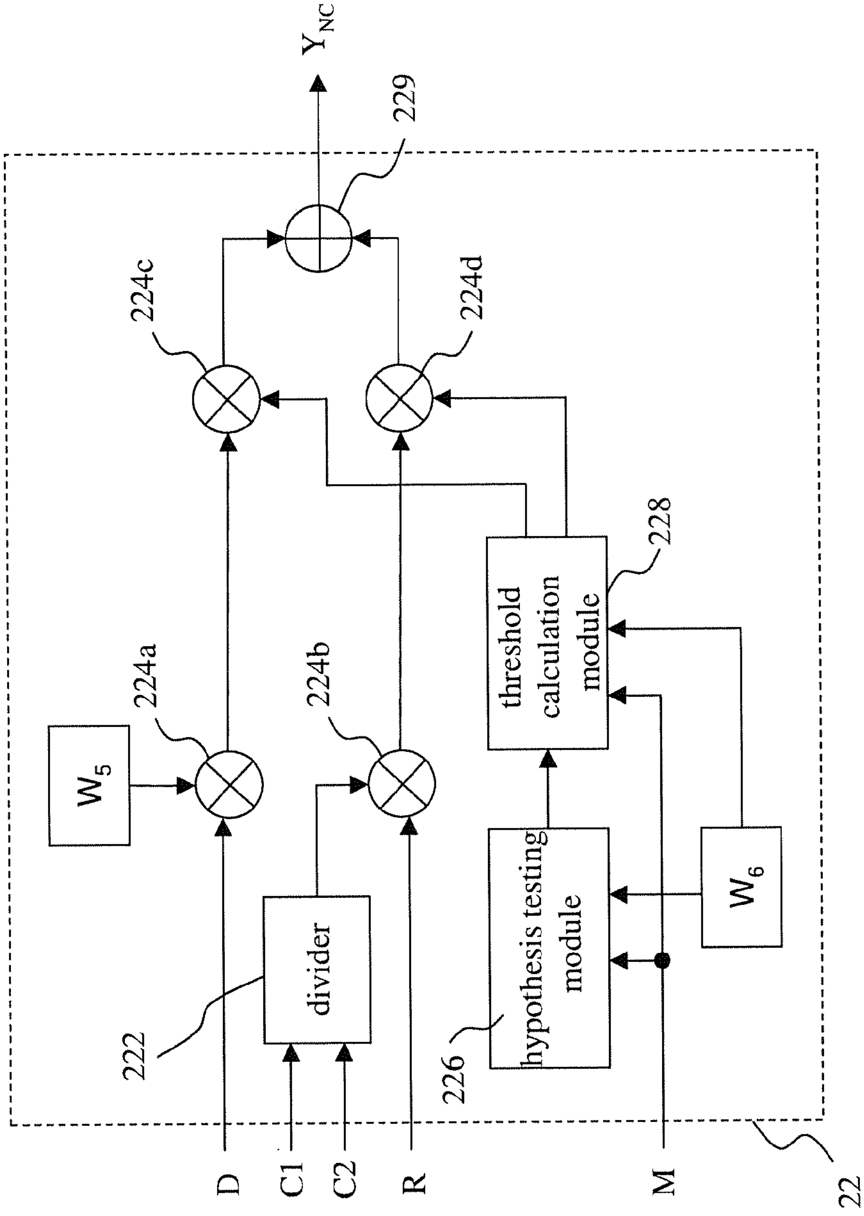
FIG. 6 is a block diagram schematically showing a noise estimator according to one embodiment of the present invention.

Refer to FIG. 1 and FIG. 2 again, and refer to FIG. 6 a block diagram schematically showing a noise estimator 22.

TJR is used to examine whether a target sound source exists. In Steps S20-S22, the noise estimator 22 provides an examination criterion and works with a threshold Γ (typically Γ=5 dB). When TJR is greater than the threshold Γ, the target sound source is regarded as existing. TJR can further be used as a ratio to alleviate cancellation of the target sound source when the target sound source is detected. TJR can further be used as a divisor to modify the optimized Wiener solution into a new Wiener solution expressed by Equation (8):

$$\begin{aligned} G_{TJR}(k,l) &= \frac{G_{opt}(k,l)}{TJR(k,l)} \\ &= \frac{P_{UD}(k,l)}{P_{UU}(k,l)}\cdot\frac{P_{UU}(k,l)}{P_{DD}(k,l)} \\ &= \frac{P_{UD}(k,l)}{P_{DD}(k,l)} \end{aligned} \quad (8)$$

A divider 222 obtains the new Wiener solution, using the input signals C1 and C2. Thus, by the hypothesis of testing TJR, the Wiener solution can be divided into $$G(k,l)=\begin{cases} G_{TJR}(k,l), & \text{if } TJR(k,l)>\Gamma \\ G_{opt}(k,l), & \text{otherwise} \end{cases} \quad (9)$$

In other words, if TJR is greater than the threshold, the new Wiener solution is adopted; if TJR is smaller than or equal to the threshold, the optimized Wiener is adopted.

After the signal M output by the divider 20 enters the noise estimator 22, a hypothesis testing module 226 uses the signal M and a parameter W6 to determine the way to process the signals. The noise estimator 22 is divided into three parts according to the value of TJR (in decibel scale) at each frequency bin k, namely: (−∞, 0], (0, Γ] and (Γ, ∞). When TJR is larger than Γ, $Y_{NC}(k,l)$ the output of the noise estimator 22 is determined by the TJR weighted new Wiener solution to preserve more desired signal. When TJR is between 0 dB and Γ, $Y_{NC}(k,l)$ is given by the optimized Wiener solution. In the case that TJR is lower than 0 dB, the target sound source is considered to be absent.

In order to further reduce the noise, a simple post filter-like method is adopted in Step S24. Similar to the functionality of the spectral gain floor $G_{min}$, D(k,l) the output of the beamformer 14 and a threshold preset by a threshold calculation module 228 are used to determine $Y_{NC}(k,l)$. Based on TJR, the result of the hypothesis testing module 226, and the parameter value W6, the threshold calculation module 228 calculates the proportion of mixing the beamformed signal D and the new Wiener solution. The beamformed signal D and a preset parameter value W5 are multiplied in a multiplier 224*a*. The result of the multiplier 224*a* and a threshold are multiplied in a multiplier 224*c*. On the other hand, the new Wiener solution $G_{TJR}(k,l)$ output by the divider 222 and the reference signal R are multiplied in a multiplier 224*b*. The result of the multiplier 224*b* and a threshold are multiplied in a multiplier 224*d*. Then, the results of the multipliers 224*c* and 224*d* are added in an adder 229 to obtain an output signal $Y_{NC}(k,l)$.

After $Y_{NC}(k,l)$ is output by the noise estimator 22, a subtractor 24 will give an output expressed by Equation (10):

$$\begin{aligned} Y(k,l) &= D(k,l)-Y_{NC}(k,l) \\ &= (1-\gamma)\cdot D(k,l) \\ &= G_{min}\cdot D(k,l) \end{aligned} \quad (10)$$

Equation (10) is considered as the noise floor when the target sound source is absent. When TJR is smaller than 0 dB, TJR is used to make a soft decision. If TJR equals 1, $Y_{NC}(k,l)$ is given by the optimized Wiener solution. On the other hand, if TJR approaches zero, $Y_{NC}(k,l)$ is reduced to the noise floor. As TJR varies dramatically in decibel scale, $Y_{NC}(k,l)$ may be almost reduced to the noise floor at very low TJRs.

Repeat Step S14-Step S24 at every frequency band. When the abovementioned steps have been undertaken for the sinusoidal waves of all frequency bands, the process proceeds to Step S26-Step S28 to send the output signal Y (k,l) whose noise has been inhibited by the subtractor 24 to the IFFT module 26 for recombination. Next, repeat Step S12-Step S28 until the calculation of all the frames of the microphones' data is completed.

In conclusion, the present invention proposes a spatially pre-processed TJR weighted filter and a method thereof, wherein two microphones are used to reduce noise in a GSC structure, wherein the TJR weighted Wiener solution thereof has superior ability to preserve the target sound signal and inhibit noise.

The embodiments described above are only to exemplify the present invention but not to limit the scope of the present invention. Any equivalent modification or variation according to the characteristics and spirit of the present invention is to be also included within the scope of the present invention.

What is claimed is:

1. A GSC-based spatially pre-processed target-to-jammer ratio weighted filter, comprising:

at least two microphones receiving audio signals, said audio signals being transformed into a plurality of frequency bands;

a beamformer and a reference generator respectively generating a beamformed signal and a reference signal for each frequency band in said plurality of frequency bands;

a power spectral density estimator (PSD estimator) calculating a power spectral density as a function of said beamformed signal and said reference signal, and obtaining a target-to-jammer ratio according to said power spectral density; and a noise estimator determining whether at least one target sound source exists according to said target-to-jammer ratio; if at least one target sound source exists, switching said noise estimator to eliminate noise from said beamformed signal and obtaining an output signal;

wherein said noise estimator further comprises a threshold calculation module calculating a ratio of mixing said beamformed signal and a new Wiener solution for estimating noise.

2. The filter according to claim 1 further comprising a fast Fourier transform module dividing each of said audio signals into a plurality of different sinusoidal waves respectively corresponding to the plurality of frequency bands.

3. The filter according to claim 1, wherein said audio signals of said at least two microphones are divided into a plurality of frames, and a fast Fourier transform module divides each said frame into a plurality of sinusoidal waves.

4. The filter according to claim 1 further comprising an inverse-fast Fourier transform module recombining said output signal of each of the frequency bands.

5. The filter according to claim 4 further comprising a subtractor subtracting said output signal of said noise estimator from said beamformed signal, and sending a result thereof to said inverse-fast Fourier transform module for recombination.

6. The filter according to claim 1, wherein said PSD estimator further comprises at least one smoothing unit performing smooth processing of at least one frequency spectrum of said beamformed signal and said reference signal.

7. A method for a spatially pre-processed target-to-jammer ratio weighted filter, comprising:

(a) using at least two microphones to receive audio signals, and using a fast Fourier transform to divide each of said audio signals into a plurality of sinusoidal waves respectively corresponding to a plurality of frequency bands;

(b) using a beamformer to convert each of said sinusoidal waves into a beamformed signal, and using a reference generator to generate a reference signal;

(c) using said beamformed signal and said reference signal to work out at least two power spectral densities, and obtaining a target-to-jammer ratio according to said power spectral densities, wherein said power spectral density of said beamformed signal is expressed by $$\begin{aligned} E[D(k,l)D^*(k,l)] &= P_{DD}(k,l) \\ &= \alpha\cdot P_{DD}(k,l-1)+(1-\alpha)\sum_{i=-w}^{w} b(i)D(k-i,l)D^*(k-i,l), \end{aligned}$$

and wherein said power spectral density of said reference signal is expressed by $$\begin{aligned} E[U(k,l)U^*(k,l)] &= P_{UU}(k,l) \\ &= \alpha\cdot P_{UU}(k,l-1)+(1-\alpha)\sum_{i=-w}^{w} b(i)U(k-i,l)U^*(k-i,l), \end{aligned}$$

and wherein k and l are a frequency index and a frame index, and wherein $\alpha$ ($0<\alpha<1$) is a forgetting factor, and b a normalization window function ($\Sigma_{i=-w}^{w} b(i)=1$), and wherein said beamformed signal and said reference signal are used to obtain an optimized Wiener solution $G_{opt}(k,l) = (E[U(k,l)U^*(k,l)])^{-1}\cdot E[U(k,l)D^*(k,l)] = P_{UU}^{-1}(k,l)P_{UD}(k,l)$, and wherein $P_{UD}$ is the cross-power spectral density of said beamformed signal and said reference signal, and wherein $$P_{DU}(k,l)=\alpha\cdot P_{DU}(k,l-1)+(1-\alpha)\sum_{i=-w}^{w} b(i)D(k-i,l)U^*(k-i,l);$$

(d) using said target-to-jammer to determine whether at least one target sound source exists, and switching a noise estimator according to a determination result to eliminate noise from said beamformed signal and obtain an output signal, and obtaining a new Wiener solution via dividing said optimized Wiener solution with said target-to-jammer ratio and expressed by $$\begin{aligned} G_{TJR}(k,l) &= \frac{G_{opt}(k,l)}{TJR(k,l)} \quad \text{and} \\ &= \frac{P_{UD}(k,l)}{P_{UU}(k,l)}\cdot\frac{P_{UU}(k,l)}{P_{DD}(k,l)} \\ &= \frac{P_{UD}(k,l)}{P_{DD}(k,l)}; \end{aligned}$$

(e) using an inverse-fast Fourier transform to recombine said output signal, and sending out a result thereof.

8. The method according to claim 7, wherein a power spectral density estimator (PSD estimator) works out said power spectral densities according to a frequency spectrum of said audio signals.

9. The method according to claim 7, wherein said audio signals that have been processed by said fast Fourier transform are expressed by $X_1(k,l)=S(k,l)+N_1(k,l)$ and $X_2(k,l)=e^{-j\omega\tau}S(k,l)+N_2(k,l)$, and wherein k and l are respectively a frequency index and a frame index, $X_1(k,l)$ and $X_2(k,l)$ said audio signal input by said microphone, S(k,l) signals of said target sound source, $N_1(k,l)$ and $N_2(k,l)$ noise in said audio signals, $\tau=d\sin\theta/c$ said audio the target signal's time delay between said two microphones, and wherein d is interspacing between said microphones, $\theta$ an arrival direction relative to a front surface.

10. The method according to claim 9, wherein when said frequency index has a value of k, said beamformed signal and a blocking vector are respectively expressed by $w_0(k)=[1+e^{-j\omega\tau}]^T$ and $h(k)=[1-e^{-j\omega\tau}]^T$, and wherein $\omega$ is an angular frequency corresponding to said frequency index k, and wherein said reference signal can be expressed by $U(k,l)=h^H(k)X(k,l)$, and wherein "H" denotes conjugation transpose.

11. The method according to claim 7, wherein said target-to-jammer ratio is equal to said power spectral density of said beamformed signal divided by said power spectral density of said reference signal.

12. The method according to claim 7, wherein in said Step (d), said target-to-jammer ratio is divided into three parts $(-\infty, 0]$, $(0, \Gamma]$ and $(\Gamma, \infty)$ to evaluate switching, wherein $\Gamma$ is a threshold, and wherein when said target-to-jammer ratio is larger than $\Gamma$, output of said noise estimator is determined by said new Wiener solution to preserve more said target sound source, and wherein when said target-to-jammer ratio is between 0 dB and $\Gamma$, output of said noise estimator is given by said optimized Wiener solution, and wherein when said target-to-jammer ratio is lower than 0 dB, said target sound source is considered to be absent.

13. The method according to claim 12, wherein said Step (d) further comprises setting said threshold for calculating a mixing ratio of said beamformed signal and said new Wiener solution and evaluating noise.

14. The method according to claim 7, wherein said Step (e) further comprises using a subtractor to subtract said output signal from said beamformed signal, and wherein difference of subtraction is recombined by said inverse-fast Fourier transform, and a result of recombination is output.

15. The method according to claim 14, wherein in said Step (a), said sinusoidal waves are divided into a plurality of frequency bands, and wherein said Step (b) to said Step (d) are repeated at every said frequency band, and wherein after said Step (b) to said Step (d) have been undertaken for all said frequency bands, said Step (e) is undertaken.

16. A method for a spatially pre-processed target-to-jammer ratio weighted filter, comprising:

(a) using at least two microphones to receive audio signals, and using a fast Fourier transform to divide said audio signals into a plurality of sinusoidal waves;

(b) using a beamformer to convert said sinusoidal waves into a beamformed signal, and using a reference generator to generate at least one reference signal;

(c) using said beamformed signal and said reference signal to work out at least two power spectral densities, and obtaining a target-to-jammer ratio according to said power spectral densities, wherein said beamformed signal and said reference signal are used to obtain an optimized Wiener solution $G_{opt}(k,l)=(E[U(k,l)U^*(k,\mathbf{1})])^{-1}\cdot E[U(k,l)D^*(k,l)]=P_{UU}^{-1}(k,l)P_{UD}(k,l)$, and wherein $P_{UD}$ is the cross-power spectral density of said beamformed signal and said reference signal, and wherein $$P_{DU}(k,1)=\alpha\cdot P_{DU}(k,l-1)+(1-\alpha)\sum_{i=-w}^{w}b(i)D(k-i,l)U^*(k-i,l);$$

(d) using said target-to-jammer ratio to determine whether at least one target sound source exists, and switching a noise estimator according to a determination result to eliminate noise from said beamformed signal and obtain an output signal, wherein said target-to-jammer ratio is divided into three parts $(-\infty, 0]$, $(0, \Gamma]$ and $(\Gamma, \infty)$ to evaluate switching, wherein $\Gamma$ is a threshold, and wherein when said target-to-jammer ratio is larger than $\Gamma$, output of said noise estimator is determined by said new Wiener solution to preserve more said target sound source, and wherein when said target-to-jammer ratio is between 0 dB and $\Gamma$, output of said noise estimator is given by said optimized Wiener solution, and wherein when said target-to-jammer ratio is lower than 0 dB, said target sound source is considered to be absent; and (e) using an inverse-fast Fourier transform to recombine said output signal, and sending out a result thereof;

wherein said power spectral density of said beamformed signal is expressed by $$E[D(k,1)D^*(k,1)]=P_{DD}(k,1)=\alpha\cdot P_{DD}(k,l-1)+(1-\alpha)\sum_{i=-w}^{w}b(i)D(k-i,l)D^*(k-i,l),$$

and wherein said power spectral density of said reference signal is expressed by $$E[U(k,1)U^*(k,1)]=P_{UU}(k,1)=\alpha\cdot P_{UU}(k,l-1)+(1-\alpha)\sum_{i=-w}^{w}b(i)U(k-i,l)U^*(k-i,l),$$

and wherein k and l are a frequency index and a frame index, and wherein $\alpha(0<\alpha<1)$ is a forgetting factor, and b a normalization window function $(\Sigma_{i=-w}^{w}b(i)=1)$.

17. The method according to claim 16, wherein said Step (d) further comprises setting said threshold for calculating a mixing ratio of said beamformed signal and said new Wiener solution and evaluating noise.

* * * * *